United States Patent [19]

Sauer, Jr. et al.

[11] Patent Number: 5,520,942

[45] Date of Patent: May 28, 1996

[54] SNACK FOOD COATING USING SUPERCRITICAL FLUID SPRAY

[75] Inventors: Robert M. Sauer, Jr., West Milford; Juan A. Menjivar, Denville, both of N.J.; Bradford A. Burns, Greyslake, Ill.

[73] Assignee: Nabisco, Inc., Parsippany, N.J.

[21] Appl. No.: 196,934

[22] Filed: Feb. 15, 1994

[51] Int. Cl.⁶ .................................................... A23L 1/10
[52] U.S. Cl. ........................ 426/289; 426/302; 426/497; 426/549; 426/560
[58] Field of Search ................................ 426/289, 302, 426/549, 560, 392, 497

[56] References Cited

U.S. PATENT DOCUMENTS

| | | |
|---|---|---|
| 2,844,469 | 7/1958 | Melnick et al. . |
| 3,484,250 | 12/1969 | Vollink et al. . |
| 3,556,411 | 1/1971 | Nord et al. . |
| 3,647,147 | 3/1972 | Cook . |
| 3,659,787 | 5/1972 | Ito . |
| 3,661,605 | 5/1972 | Rubin et al. . |
| 3,754,710 | 8/1973 | Chimura . |
| 3,907,202 | 9/1975 | Binoche . |
| 3,939,281 | 2/1976 | Schwengers . |
| 4,038,422 | 7/1977 | Keyser et al. . |
| 4,055,300 | 10/1977 | Binoche . |
| 4,097,000 | 6/1978 | Derr . |
| 4,335,149 | 6/1982 | Stipp . |
| 4,346,849 | 8/1982 | Rood . |
| 4,582,731 | 4/1986 | Smith . |
| 4,675,198 | 6/1987 | Sevenants . |
| 4,703,060 | 10/1987 | Traitler et al. . |
| 4,762,725 | 8/1988 | Player et al. . |
| 4,801,465 | 1/1989 | Sponer . |
| 4,810,373 | 3/1989 | Rice . |
| 4,816,275 | 3/1989 | Reich . |
| 4,882,107 | 11/1989 | Cavender et al. . |
| 4,898,673 | 2/1990 | Rice et al. . |
| 4,910,031 | 3/1990 | Budd et al. . |
| 4,923,720 | 5/1990 | Lee et al. . |
| 4,960,600 | 10/1990 | Kester et al. . |
| 4,970,093 | 11/1990 | Sievers et al. . |
| 5,027,742 | 7/1991 | Lee et al. . |
| 5,035,908 | 7/1991 | Acora et al. . |
| 5,108,799 | 4/1992 | Hoy et al. . |

(List continued on next page.)

FOREIGN PATENT DOCUMENTS

| | | |
|---|---|---|
| 2-113866 | 4/1990 | Japan . |
| 643713 | 6/1984 | Switzerland . |

OTHER PUBLICATIONS

Neilsen, et al., "Supercritical Fluid Spray Application Technology: A Pollution Prevention Technology for the Future," Union Carbide Chemicals and Plastics Company, Inc., South Charleston, WV, 17th Water Borne & Higher Solids Coatings Symposium, New Orleans, LA (Feb. 21–23, 1990).

Shaw, et al., "Supercritical Water, A Medium for Chemistry," *C & EN*, pp. 26–39 (Dec. 23, 1991).

Rizvi, et al., "Supercritical Fluid Extraction: Fundamental Principles and Modeling Methods," *Food Technology*, pp. 55–65, (Jun. 1986).

"Coating Method Uses Supercritical Fluid," *C & EN*, p. 30, Feb. 18, 1991.

*Primary Examiner*—Anthony J. Weier

[57] ABSTRACT

Oil-based or fat-based carriers or solvents are replaced in whole or in part by a supercritical fluid or high pressure gas as a spray medium or carrier for food additives or food enhancers. Reduced fat, low fat, and even no-fat food products may be produced by topically applying the additive or enhancer using a supercritical fluid as a fat or oil replacement. Post baking or post cooking application of the food additives or enhancers substantially reduces the loss of the additives or enhancers due to heat decomposition or a volatilization in the production of food products such as baked goods, snacks, and nuts. Food additives or enhancers which may be topically applied to the food substrates include flavorants, colorants, moisture barriers, vitamins and minerals, and odorants or fragrances.

31 Claims, 2 Drawing Sheets

U.S. PATENT DOCUMENTS

| | | |
|---|---|---|
| 5,116,628 | 5/1992 | Ogasahara et al. . |
| 5,120,559 | 6/1992 | Rizvi et al. . |
| 5,130,150 | 7/1992 | Averbach . |
| 5,135,766 | 8/1992 | Hermsen et al. . |
| 5,208,058 | 5/1993 | Kotani et al. . |
| 5,225,222 | 7/1993 | Cha et al. . |
| 5,298,268 | 3/1994 | Maegli . |
| 5,304,390 | 4/1994 | Condron et al. . |
| 5,312,635 | 5/1994 | Kazlas et al. . |

FIG. 2

SNACK FOOD COATING USING SUPERCRITICAL FLUID SPRAY

FIELD OF THE INVENTION

The present invention relates to the production of no-fat, low fat and reduced fat coated foods such as chips, nuts, bread sticks, crackers and cookies, using a supercritical fluid as a solvent/carrier for edible, heat-sensitive or highly volatile ingredients such as oil- or fat-soluble flavors, colorants, odorants, or vitamins.

BACKGROUND OF THE INVENTION

The coating of baked products by spraying with an oleaginous or hydrophobic composition is disclosed in U.S. Pat. Nos. 5,130,150, 4,960,600, 4,038,422, and 3,484,250. The dispensing of pressurized oil-based compositions from a pressurized container onto a food product such as meat or a salad is disclosed in U.S. Pat. Nos. 4,801,465 and 2,844,469, respectively.

However, in the topical application of flavorants, colorants, odorants, or other food additives or compositions to foods using an oleaginous composition, such as spray oil, as a solvent or carrier substantially increases the fat content of the product. The oil based carrier not only serves as a carrier for the additive but also may promote desirable adhesion of the additive to the substrate. A glossy appearance, lubricous mouth feel, and desirable color, flavor, and textural attributes may also be provided to the final product by the oil-based carrier.

Replacement of oil with water as a spraying medium can adversely affect the tenure and microbial stability of products such as baked goods. While excess water may be removed by further heating or dying, these additional steps may decompose or volatilize heat sensitive or volatile additives. The additional heating may also increase "checking" or breakage problems in baked goods or adversely affect their flavor, color, appearance, or texture.

U.S. Pat. No. 4,335,149 discloses the direct condensation of volatiles, such as coffee aroma, on a food substrate, such as coffee, at cryogenic temperatures. The substrate is cooled cryogenically and then fluidized. The gaseous volatiles are then condensed onto the cryogenically cooled substrate.

Direct application of flavorants, colorants, odorants, or other additives without a carrier, solvent, or diluent leads to problems of uneven distribution of the additive, localized concentrations or "hot spots" of the additive, and loss of the desirable appearance, taste and textural attributes imparted by oil-or fat-based carriers.

The use of supercritical carbon dioxide as a solvent for spraying inedible coatings onto an inedible substrate is disclosed in U.S. Pat. Nos. 5,108,799, 5,027,742, 4,970,093, 4,923,720, 4,882,107, and 4,582,731 and in Nielsen et al, "Supercritical Fluid Spray Application Technology: A Pollution Prevention Technology For The Future," Union Carbide Chemicals and Plastics Company, Inc., South Charleston, W. Va., 17th Water Borne & Higher Solids Coatings Symposium, New Orleans, La. (Feb. 21–23, 1990).

Shaw et al, C & EN, pages 26–39 (Dec. 23, 1991) discloses that the extraordinary solvating power, high compressibility, and mass transport characteristics of supercritical water make it an unusual medium for chemical reactions.

Rizvi et al, Food Technology, pages 55–65 (June 1986) discloses the use of supercritical fluids as solvents for the extraction of food components from foods such as hops, coffee, tea, tobacco, and spices.

U.S. Pat. No. 5,035,908 discloses injecting gas or supercritical fluid into a coffee fluid in the production of soluble coffee forms such as freeze-dried and roasted whole bean look-alikes.

U.S. Pat. No. 5,120,559 discloses injection of a supercritical fluid carrying various flavors, colorants, or other solubilized materials into a dough.

However, spray coating of a baked product or other food using a supercritical fluid or high pressure gas as a carrier to reduce fat content is not disclosed in these references.

The present invention provides a process for the preparation of no-fat, low-fat, and reduced fat coated foods such as baked goods, snacks, nuts, and the like by replacing a substantial portion of an oil-based carrier with a high pressure gas or supercritical fluid as a carrier and/or solvent for food additives such as flavorants, colorants, moisture barriers, vitamins, and odorants. The no-, low-, and reduced fat products of the present invention exhibit the appearance, taste, and textural attributes of higher fat or oil content sprayed products.

SUMMARY OF THE INVENTION

In the present invention, no-, low-, or reduced-fat foods such as nuts, chips, snacks, crackers, cookies, breadsticks, or other baked goods are produced using a high pressure gas or a supercritical fluid, such as supercritical carbon dioxide as a solvent or carrier for an oil- or fat-soluble flavorant, odorant, vitamin, other edible heat sensitive or highly volatile food ingredients, or edible moisture barriers such as waxes and hydrocolloids. The high pressure gas or supercritical fluid, preferably supercritical carbon dioxide, replaces a substantial portion of a fat- or oil-based carrier or solvent for topical application of a heat sensitive or volatile ingredient to a baked, fried, roasted, microwaved, or cooked product. The supercritical fluid or high pressure gas and the volatile or heat sensitive ingredient may be sprayed onto the food product at low temperatures, prior to or after insertion of the product into a package.

DETAILED DESCRIPTION OF THE INVENTION

In embodiments of the present invention, the amount of oil or fat-based carriers or solvents used to topically apply food additives or food enhancers may be substantially reduced or eliminated to enable production of reduced fat, low fat, and even no-fat products. The oil-based or fat-based carriers or solvents are replaced in whole or in part by a supercritical fluid or high pressure gas. The supercritical fluid or high pressure gas serves as a spray medium or carrier for flavorants, odorants, colorants, moisture barriers, vitamins, other food additives or food enhancers, and mixtures thereof. In embodiments of the invention, post baking or post cooking application of the food additives or enhancers substantially reduces loss of the additives or enhancers due to heat decomposition or volatilization in the production of food products such as baked goods or leavened products, snacks, and nuts.

As used herein, a reduced fat food product is a product having its fat content reduced by at least 25% by weight from the standard or conventional product. A low fat product has a fat content of less than or equal to about two grams of fat per 30 gram serving. A no-fat or zero-fat product has a fat content of less than or equal to about 0.5 grams of fat per 30 gram serving or less than or equal to about 1.67% fat, based upon the total weight of the final product.

The food additive is spray coated onto the surface of a food product by vaporizing a supercritical fluid or high pressure gas from the additive. The additive coating is obtained from a solution, suspension, or dispersion of the additive and a supercritical fluid or high pressure gas. Vaporization occurs by passage of the admixture of supercritical fluid and additive from a high pressure zone through an orifice or spray head to a low pressure zone outside of the orifice to form a spray of food additive particles or droplets which are deposited onto predetermined areas of the food surface. The food additive, high pressure gas or supercritical fluid spray may undergo a pressure drop off at least about 450 psi, generally at least about 900 psi upon spraying to achieve atomization. The deposition is preferably as an essentially uniform film covering substantially the entire food surface.

As used herein, reference to supercritical fluids as solvents for the food additive connotes the dissolving of the food additive by the supercritical fluid or vice versa. However, the invention also includes the dispersion and suspension of the food additive by the supercritical fluid. Thus, it is to be understood that solvency, and carrier are intended to mean that the additive is rendered into a more dilute flowable condition by virtue of the supercritical fluid or high pressure gas. It includes dissolving, suspending, entraining, and/or dispersing of the food additive by the supercritical fluid or high pressure gas or vice versa so that the admixture is characterizable by a lower viscosity and a more fluid composition for the transport of the food additive.

Near-supercritical liquids also demonstrate solubility characteristics and other pertinent properties similar to those of supercritical fluids. The solute may be a liquid at the supercritical temperatures, even though it is a solid at lower temperatures. In addition, fluid modifiers can often alter supercritical fluid properties significantly, even in relatively low concentrations, greatly increasing solubility for some solutes. As used herein, the phrase "supercritical fluid" indicates a compound above, at, or slightly below the critical temperature and pressure of that compound.

At pressures above the critical point, the resulting supercritical fluid, or "dense gas" will obtain densities approaching those of a liquid and will assume some of the properties of a liquid. These properties are dependent upon the fluid composition, temperature, and pressure. Just above the critical temperature, small changes and pressure result in large changes in the density of the supercritical fluid. The "liquid-like" behavior of a supercritical fluid at higher pressures results in greatly enhanced solubilizing capabilities compared to those of the "subcritical" compound with higher diffusion coefficients and an extended useful temperature range compared to liquids.

In the present invention, the greater the ratio of additive carried to the amount of supercritical fluid, the quicker are the coating processing times and the less the amount of supercritical fluid required for coating the product. It has been found that increasing the pressure increases the amount of food additive carried per unit weight of supercritical fluid. The carrier mechanism may be dissolution of the additive in the supercritical fluid or vice versa, or it may involve dispersion, suspension, entrainment, or combinations thereof. In the present invention, the ratio of the weight of food additive to the weight of supercritical fluid carrying or admixed with the food additive may be at least about 1:5, preferably at least about 1:2, most preferably at least about 1:1 on a consistent basis. It is believed that at weight ratios of additive to carbon dioxide in the range of about 1:1 to 3:1, for example, there is a single phase flow of material instead of two-phase flow and increasing system pressure (e.g. up to 3900 psi) results in a linear increase in grams of flavor delivered per gram of carbon dioxide.

Exemplary compounds which are known to have utility as supercritical fluids are given in Table 1:

TABLE 1

| | Examples Of Supercritical Solvents | | | |
|---|---|---|---|---|
| Compound | Boiling Point (°C.) | Critical Temperature (°C.) | Critical Pressure (atm) | Critical Density (g/cm$^3$) |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Cyclohexanol | 155.65 | 356.0 | 38.0 | 0.273 |
| Xenon | −108.2 | 16.6 | 57.6 | 0.118 |
| Krypton | −153.2 | −63.8 | 54.3 | 0.091 |
| Nitrogen | −195.8 | −147.1 | 33.5 | 0.311 |

Supercritical carbon dioxide fluid and/or supercritical nitrogen fluid is preferably used in the present invention because of the low toxicity, low critical temperature, and low cost of carbon dioxide and nitrogen. Other supercritical fluids and mixtures thereof may be used provided the compounds are of low toxicity and their critical temperatures are sufficiently low so as not to result in heat decomposition or excessive volatilization of the food additive. In addition, the supercritical fluid should preferably be that of a nonflammable compound. For example, nitrous oxide ($N_2O$) may be used as a supercritical fluid alone or in combination with carbon dioxide. In the present invention, a substantially thinner, uniform layer of the additive is deposited upon the food substrate than is achieved by the conventional spray oil deposition method. The layer of the food additive on the substrate surface may be continuous or discontinuous. The liquid and/or solid particles which are deposited may fuse or coalesce on the surface or may be deposited as a thin mask of discrete particles. It is believed that the attainment of very thin coatings which are substantially uniformly distributed over substantially the entire surface of the food substrate provides for the initial appearance, taste, and textural attributes of fat or oil sprayed products which have substantially thicker coatings. In addition, the use of less shortening or fat as a carrier decreases the taste masking effect that the fat has on flavorants. Thus, even if smaller amounts of additives are deposited on the surface, their surface area initially available to the tongue, teeth and saliva are not substantially reduced by reducing the coating thickness. Also, the deposition of small particles which do not coalesce into a flat continuous layer may increase the surface area available for initial sensory impact by providing peaks and valleys.

The additive particles supplied in the spray to the food surface may be from about 1 micron in diameter to about 100 microns in diameter. Exemplary thicknesses of the food additive coating may range from about 1 micron to about 100 microns.

The food additive may be applied to the food substrate without the use of a solvent or carrier other than the supercritical fluid or high-pressure gas. Solvents or carriers other than the supercritical fluid or high pressure gas which may be used in the present invention include non-toxic, edible solvents which are capable of dissolving, dispersing, or suspending the food additive in combination with the supercritical fluid. Although minimal, if any, use of a carrier other than the supercritical fluid is generally desired, inclusion of other solvents or carriers for the food additive may be needed for delivery of the food additive to the apparatus for admixing with the supercritical fluid. In addition, commercially available forms of the food additive may include a solvent carrier. For example, the additive solvent may be an oil for fat-soluble flavors or vitamins. Glycerine, propylene glycol, ethanol, emulsifiers, and water are examples of solvents or carriers which may be used with the additives.

In addition, conventional oleaginous-based carriers, such as spray oil may be used in combination with the supercritical fluid where the desired solvency, dispersability or suspension ability of the food additive may not be achieved using the supercritical fluid alone. However, the present invention still permits substantial reduction in the fat content of food products. In the present invention, the amount of oleaginous carrier or solvent, such as spray oil, is reduced by at least about 25% by weight, preferably at least about 50% by weight, most preferably at least about 75% by weight, based upon the weight of the oleaginous carrier conventionally used in the topical application of a food additive or enhancer.

Conventional solvents or carriers for the additives may range from 0 to about 75% by weight, based upon the total weight of the additive, solvent, and supercritical fluid. For example, the solvent may be present in the spray formulation in an amount of from about 0.25% by weight to about 40% by weight, based upon the total weight of the spray formulation.

Admixing of the supercritical fluid, such as supercritical carbon dioxide fluid, with the food additive and optional solvent, reduces the viscosity of the food additive and its solvent to a range where it can be atomized by passing it through a spray orifice, such as that of an airless, air-assisted, or air spray gun. After atomization, a substantial portion of the supercritical fluid vaporizes, leaving a substantial amount of the original food additive formulation and its optional conventional solvent. Upon contacting the substrate food, the remaining fluid mixture of food additive and its optional solvent may flow to produce a thin, uniform, smooth film on the substrate. If the food additive is a particulate or if a conventional solvent is not used or is used in low amounts, then the additive may be solidified as fine particles or it may be deposited as fine droplets that are uniformly dispersed onto the substrate surface.

In embodiments of the present invention, the additive, such as a flavorant is pressurized, by means of a pump for example, and admixed with a supercritical fluid. The pressurized mixture of the food additive dissolved, suspended or dispersed in the supercritical fluid may then be transported to the nozzle of a spray device. The supercritical fluid containing the food additive is rapidly passed through a relatively narrow orifice into an expanded area which causes an immediate pressure drop. The supercritical fluid expands to a gas or vapor essentially immediately, at an expansion rate which far exceeds the expansion rate of the more dense or viscous food additive and any optional solvent that accompanies the food additive. The optional solvent may expand faster than the food additive. The food additive and any accompanying solvent is broken or atomized into discrete particles or droplets. The gaseous or vaporous component which was the supercritical fluid, disappears from the particles or droplets into the general atmosphere.

The spray pressure used in the present invention depends upon the food additive formulation, the supercritical fluid being used as a carrier, and the viscosity of the liquid mixture. The minimum spray temperature just before expansion is at least at or slightly below the critical pressure of the supercritical fluid. It has been found that increasing the pressure substantially above the critical pressure of the supercritical fluid increases the amount of the food additive carried by the supercritical fluid. In embodiments of the invention, the spray pressure may be at least about 2,000 psig, preferably at least about 3,000 psig, most preferably greater than 5,000 psig and below about 10,000 psig.

The spray temperature which is used in the present invention depends upon the food additive formulation, the supercritical fluid being used, and the concentration of the supercritical fluid in the liquid mixture. The temperature of the product being sprayed and the amount and temperature of air entrained during spraying may also affect the spray temperature. The minimum spray temperature is at or slightly below the critical temperature of the supercritical fluid. The maximum spray temperature is the highest temperature at which the components of the liquid mixture, such as the flavorant or odorant, are not significantly thermally degraded during the time that the liquid mixture is at that temperature.

Prior to atomization, the spray composition is preferably heated to avoid condensing of solids, such as solid carbon dioxide, and any ambient water vapor present due to high humidity in the surrounding spray environment. For example, if the supercritical fluid is supercritical carbon dioxide fluid, rapid expansion of the supercritical fluid escaping from the spray nozzle could cool to the point of condensing solid carbon dioxide or water which could result in clogging of the spray orifice. For supercritical carbon dioxide, the minimum spray temperature is about 31° C. The thermal stability of the components in the admixture determines the maximum spray temperature. Exemplary spray temperatures range from about 35° C. to about 70° C. As the proportion of supercritical carbon dioxide in the admixture increases, higher spray temperatures may be used to counteract the greater cooling effect caused by the expansion of the supercritical carbon dioxide.

Rapid cooling of the spray to near or below ambient temperature while it is close to the spray orifice may entrain ambient air into the spray. Entrainment of the ambient air warms the spray to ambient or near ambient temperature before the spray reaches the substrate. The rapid cooling may be beneficial in reducing the amount of food additive which evaporates in the spray in comparison to the amount lost in conventional heated airless sprays.

The spray temperature may be obtained by heating the supercritical fluid or the food additive or both before admixing them. The mixture of supercritical fluid and food additive may be heated before it enters the spraying device, such as a spray gun or spray drying nozzle. The spray gun itself may be heated, or the heated mixture may be circulated to or through the spray gun to maintain the spray temperature.

The environment in which the food substrates are sprayed may be air or other gas environments under conditions at or near atmospheric pressure. Other gas environments which may be used include air with reduced oxygen content or inert gasses such as nitrogen, carbon dioxide, helium, argon, xenon, or a mixture thereof. For example, the food substrate, such as crackers may be placed in oxygen impermeable packaging, optionally flushed with nitrogen, and then sprayed with the supercritical fluid mixture for the application of an odorant to the food product and its package.

Known spray devices, such as conventional spray guns may be used in the present invention. Conventional spray devices include airless and air-assisted airless spray devices and electrostatic spray devices. Conventional spray nozzles and spray tips are disclosed, for example, in U.S. Pat. Nos. 3,556,411, 3,647,147, 3,659,787, 3,754,710, 3,907,202, 4,055,300, 4,097,000, and 4,346,849. The admixture of supercritical fluid and food additive may be filtered using conventional filters to remove particulates that may clog the spray orifice.

The spray may be in the shape of a cone that is circular or elliptical in cross section. It may be in the shape of a flat fan, a feathered spray, or a rounded parabolic shaped spray.

The distance from the spray orifice to the substrate surface may range, for example, from about 4 inches to about 36 inches.

Exemplary food additives or enhancers which may be topically applied to food substrates in accordance with the present invention include flavorants or seasonings, odorants or fragrances, colorants, moisture barriers, vitamin and mineral supplements, and mixtures thereof. The additives may be heat sensitive or highly volatile components. The food additives may be fat or oil-soluble or water soluble ingredients. The food additive may also be a non-nutritive sweetener.

In the present invention, "heat-sensitive" additives include compositions, ingredients, or components that undergo a chemical decomposition or reaction into components which do not have the desired activity or characteristic flavor of the starting composition. Some heat-sensitive or heat-labile compositions, upon degradation, may result in the formation of undesirable compounds which produce an unpleasant taste or mouth feel and can affect the shelf stability of the food product. Heat-sensitive additives also include materials, such as flavoring compositions, that can change their physical integrity when heated, such as melting, volatilizing, or separation of components.

The flavorants, odorants, and colorants which may be sprayed in accordance with the present invention may be the same composition or compound or they may be different. For example, a commercially available flavorant composition may also function as an odorant and/or a colorant. The flavorings, colorants, and odorants may be natural or artificial.

Exemplary flavorants and seasonings which may be sprayed in accordance with the present invention include vanilla, vanillin, orange, honey, butterscotch, chocolate, coffee, cocoa, and butter flavorings, fruit flavorings, cheese flavorings, barbecue flavorings, onion, garlic, jalapeno, capsicum, and sour cream flavorings, corn flavorants, vegetable flavorings, spice flavorings, fried flavorings, mixtures thereof, and the like.

Examples of commercially available flavorants which may be sprayed in accordance with the present invention are TASTEMAKER natural fried type flavor 243736, TASTEMAKER artificial fried flavor 246596, TASTEMAKER artificial French fry flavor 244315, TASTEMAKER artificial fried potato flavor 251130, TASTEMAKER natural fried corn flavor WONF 244796, FIRMENICH French Fry potato flavor 290-13-09/AH and MCCORMICK French Fry Flavor F48512.

Exemplary odorants or fragrances which may be sprayed in accordance with the present invention include aromatic materials which convey desirable aromas, such as cinnamon, hickory-smoked odorants, barbecue odorants, fruit fragrances, and the like.

Exemplary colorants or coloring materials which may be sprayed onto the food substrates in accordance with the present invention include natural and artificial food colorings, browning compositions, dyes, and lakes.

The flavorant, odorants, and colorants may be used in effective amounts to provide a desirable level of flavor, odor, and coloring, respectively in the final coated product which is at least comparable to levels provided by the use of conventional oils or fat carriers. Exemplary amounts of these additives range from about 0.01% by weight to about 3% by weight, based upon the total weight of the final coated food product.

Exemplary vitamin additives include multi-vitamin premixes, individual vitamins, such as Vitamin E, Biotin, Vitamin A, Vitamin D, Niacin, Vitamin $B_6$, Vitamin $B_2$, Vitamin $B_1$, Vitamin C, and folic acid. Exemplary minerals which may be used include calcium, iron, zinc, copper, magnesium, and phosphorous. The vitamin and/or mineral additives are used in amounts to provide a therapeutically effective amount of the additive in the final product. Exemplary amounts range from about 0.01% by weight to about 0.25% by weight of a vitamin and mineral premix, based upon the total weight of the final coated food product.

Non-nutritive sweeteners for topical application in accordance with the present invention include saccharine, sodium cyclamate, acesulfame K, sucralose, cyclohexylamine, dihydrochalcone sweeteners, aspartame or other L-aspartic acid derivatives. The non-nutritive sweetener may be sprayed onto the food substrate to provide sweetening amounts of the sweetener on the final product. Exemplary amounts of the non-nutritive sweetener are from about 0.01% to about 1.0% by weight, based upon the total weight of the final, coated food product.

Exemplary moisture barriers which may be sprayed onto the substrates in accordance with the present invention include edible waxes, edible shellacs, and hydrocolloids such as alginate, pectin, carrageenan, guar, and xanthan gum, and zein. Edible waxes include complex mixtures of alcohols, acids, and esters formed from long-chain fatty acids and low-chain alcohols, as well as long-chain alkanes, and are generally plastic solids at room temperature. The edible waxes may be natural or synthetic wax such as beeswax, and/or vegetable waxes such as rice bran wax and/or carnauba wax. Exemplary amounts of the edible moisture barriers are from about 0.5% by weight to about 5% by weight, based upon the total weight of the final coated product.

The shortening or fat which may be used in the sprays in accordance with the present invention may be any edible fat or oil or mixture thereof and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats which are process compatible may also be used. The shortenings or fats may be solid or fluid at room temperatures of from about 75° F. to about 90° F.

Exemplary emulsifiers which can be used include lecithin, sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactylate. Exemplary amounts are up to about 3% by weight of one or more emulsifiers based upon the weight of the final coated product.

Exemplary of the food products which may be coated in accordance with the present invention are farinaceous based or starch based foods such as crackers, cookies, potato chips, corn chips, extruded or expanded snacks, such as cheese balls, breadsticks, chip-like snacks which may be baked, microwaved, and/or fried, roasted peanuts, cashews and almonds, and the like. The chip-like snacks may be produced from vegetable slices or fabricated from a dough or dough-like mixture.

Figure 1:
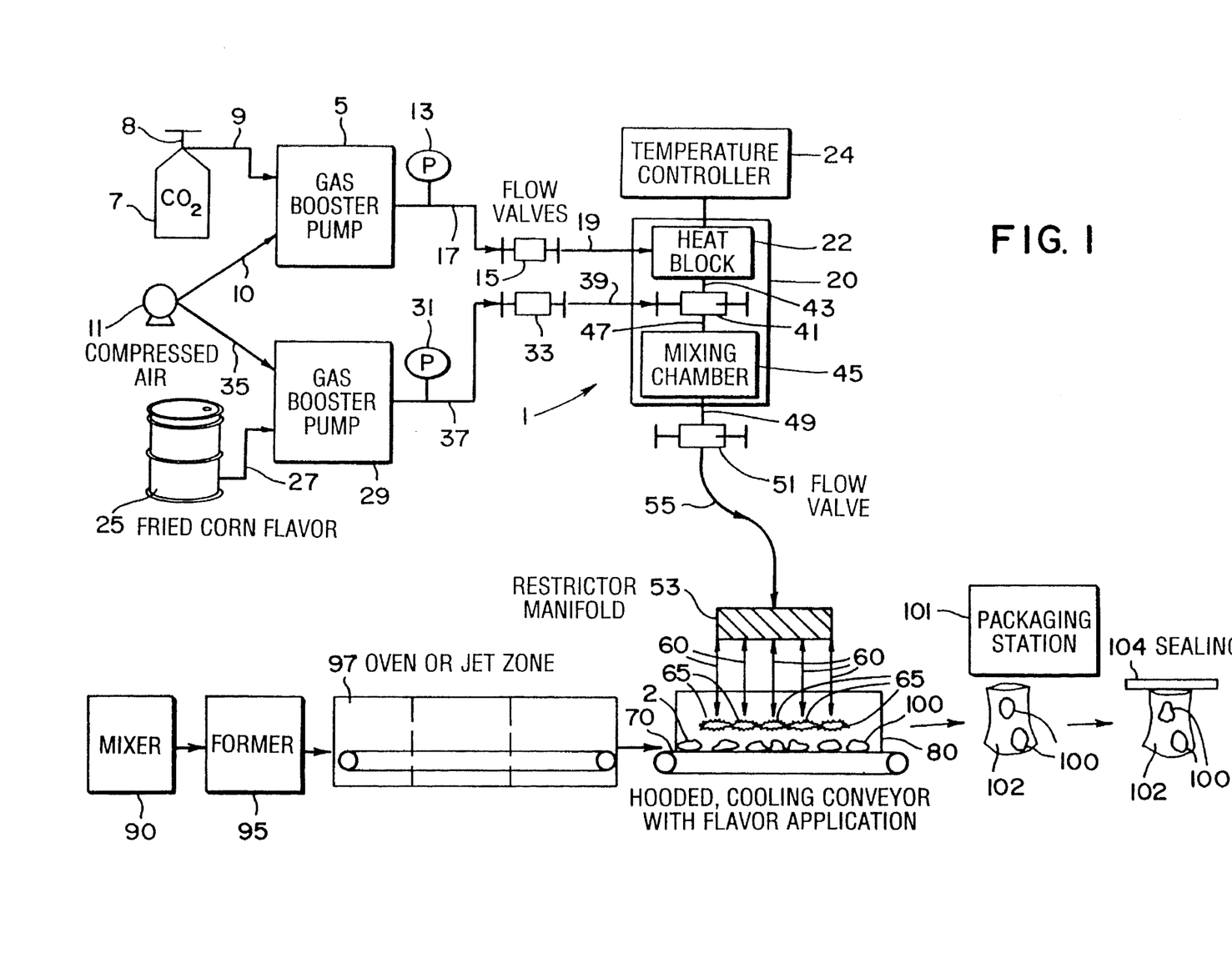
FIG. 1 is a schematic diagram of a supercritical fluid flavor delivery system for the post-bake spraying of snack chips before they are packaged.

A supercritical fluid delivery system 1 for the topical application of flavor to baked products, such as snack chips 2, is shown schematically in FIG. 1. As shown in FIG. 1, carbon dioxide is supplied to a gas booster pump 5 from a liquid carbon dioxide cylinder 7 or any other source of carbon dioxide. The carbon dioxide cylinder 7 may be equipped with valves 8, pressure gages (not shown), and pressure regulators (not shown) known in the art for controlling the flow of the carbon dioxide to the gas booster pump 5. The gas booster pump 5 may be an air driven piston pump, manufactured by Haskel Inc., Engineered Products Division, Burbank, Calif. or other conventional high pressure pumps. The gas booster pump 5 preferably is capable of boosting the pressure of the carbon dioxide to 10,000 psig. Booster pumps manufactured by American Leewa may also be used. The carbon dioxide may be supplied to the gas booster pump 5 via a conduit 9. The gas booster pump 5 may be supplied with compressed air via a conduit 10 from a conventional air compressor 11. The compressed air is used to drive the gas booster pump 5. The pressure delivered by the booster pump 5 may be controlled by a pressure gage 13, a pressure regulator (not shown) and flow control valves 15 located in an outlet conduit 17. The highly pressurized carbon dioxide may be fed at a desired pressure and feed rate via an inlet conduit 19 to a heat insulated heating and mixing chamber 20.

The carbon dioxide gas may be fed to a heating block 22 located inside the insulated chamber 20. The heating block 22 may comprise electrical resistance heaters (not shown), the temperature of which is controlled by a temperature controller 24. The heating block 22 may be used to heat the carbon dioxide above its critical temperature to obtain supercritical carbon dioxide for admixture with the food additive, such as a fried corn flavor.

The liquid flavorant may be supplied from a storage vessel 25 via a conduit 27 to a gas booster or conventional high pressure pump 29 similar to the pump 5 used for pressurizing the liquid carbon dioxide. The pressure and flow rate of the flavorant may be controlled and maintained by the use of pressure gages 31, pressure regulators (not shown) and flow control valves 33 similar to those used for the carbon dioxide. The gas booster pump 29 may be supplied with compressed air by means of a conduit 35 in gaseous communication with compressor 11. The pressurized flavorant may be fed to the heating and mixing chamber 20 by means of a gas booster outlet conduit 37 and a mixing chamber supply conduit 39. The pressurized flavorant may be fed to a mixing T or mixing valve 41 located within the heating and mixing chamber 20. The supercritical carbon dioxide may be separately fed to the mixing valve or T 41 from the heating block by means of a conduit 43. The admixture of supercritical fluid and the flavorant may then be passed to a mixing chamber 45 via a conduit 47 for further mixing to obtain a substantially homogeneous mixture. The heating and mixing chamber 20 may be a jacketed vessel for maintaining a desired temperature and/or for heating of the admixture of supercritical fluid and flavorant.

The admixture of supercritical fluid and flavorant may exit the heating and mixing chamber 20 by means of an exit conduit 49 which contains a flow valve 51 for controlling the flow of the admixture to a restrictor manifold 53 via a conduit 55. The manifold 53 may supply the admixture to a plurality of spray nozzles 60 for spraying a baked snack product 2 with an atomized mist 65 while it is being conveyed on a continuous belt 70 in a hooded, cooling conveyor 80.

The snack chips 2 may be produced by mixing ingredients comprising flour, shortening or fat, and water in a mixing device 90, such as a batch mixer, cooker extruder, or continuous mixer. The dough may be formed into pieces in dough forming apparatus 95 such as dough sheeters, reciprocating cutters, and rotary cutters, molders, and dies. The dough pieces may be baked in a multi-zoned gas fired oven or fluidized bed, Jet Zone oven 97 to obtain baked snack chips 2. The baked snack chips 2 from the oven 97 may then be fed to the hooded, cooling conveyor 80 for direct spraying of the flavorant onto the surfaces of the baked snack chips 2. The baked snack chips 2 may be cooled to a temperature of from about 70° F. to about 95° F. for application of the spray. The coated chips 100 may then be conveyed to a packaging station 101 for packaging in a proper shelf stable package 102 in known manner. The package 102 may be sealed in a sealing unit 104 to obtain a packaged snack 100 having a shelf stability of at least about 2 months, preferably at least about 6 months.

The conveyor belt 70 of the hooded cooling conveyor 80 may be of a mesh design so as to permit spraying of the supercritical fluid admixture on both the top and bottom surfaces of the baked snack chips 2.

In other embodiments of the present invention, the baked snack chips 2 or other food pieces may be cooled and then transferred to a rotatable vessel for tumbling of the chips 2 or other substrate food products while they are being sprayed with the supercritical fluid mixture. The tumbler may comprise a baffled, rotating cylinder which is downwardly inclined from its input end to its output end. A spray manifold and spraying devices may be arranged along the longitudinal axis of the cylinder for direct application to the bottom and top surfaces of the individual pieces as they are tumbled.

Figure 2:
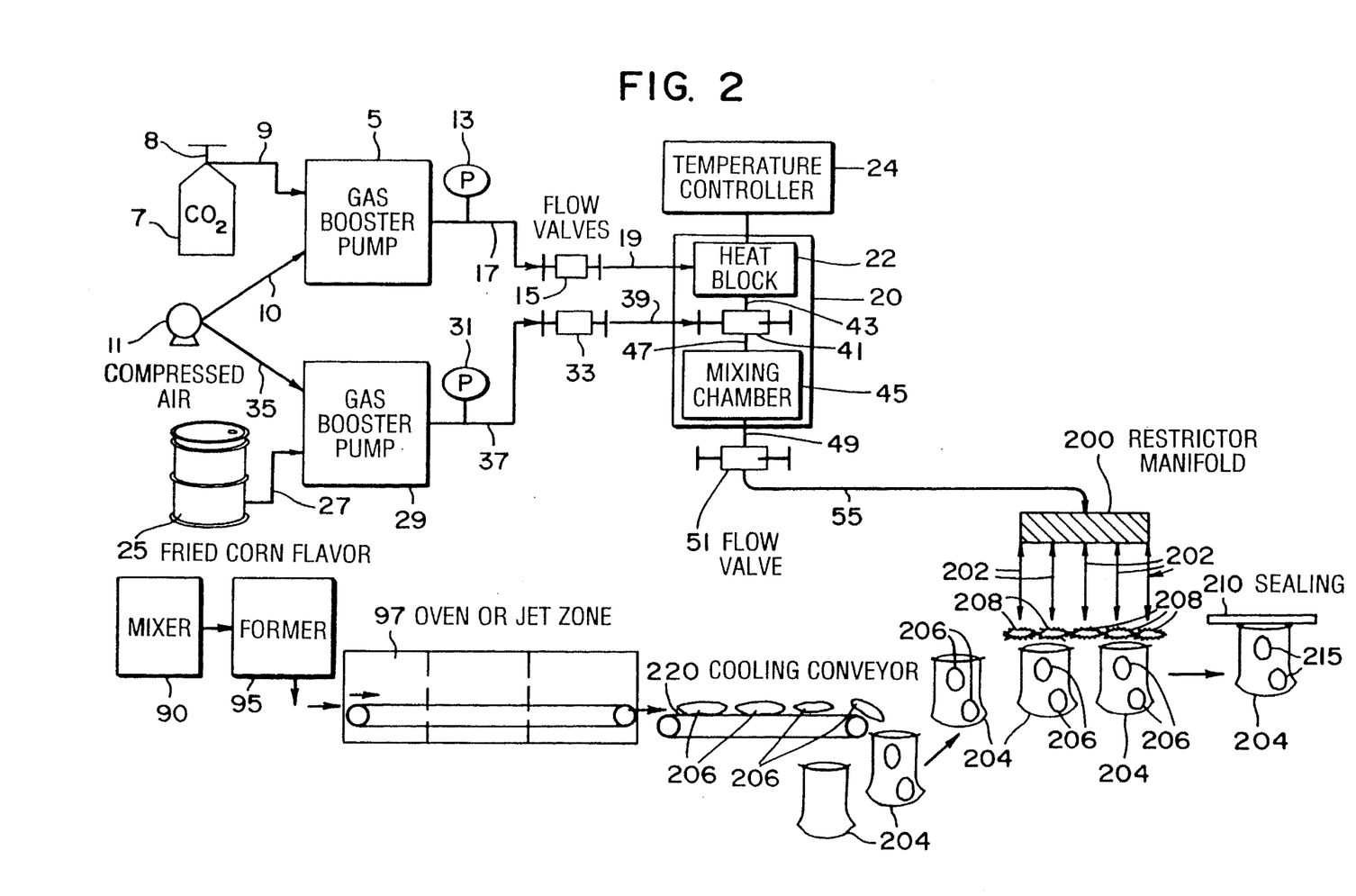
FIG. 2 is a schematic diagram of a supercritical fluid flavor and fragrance delivery system for the spraying of snack chips in a package.

As shown schematically in FIG. 2, the supercritical fluid spray comprising the supercritical fluid and food additive may be applied to the food substrate while it is in its package. The supercritical fluid mixture may be produced using gas booster pumps 5, 29, valves 8, 15, 33, 51, pressure gages 13, 31, and a heating and mixing chamber 20 as used in the embodiment of FIG. 1. The mixture of supercritical carbon dioxide and flavoring and odorant may then be fed to a manifold 200 of a spray system 202 for spraying into the open packages 204 containing the baked snack chips 206.

The packages 204 may be previously flushed with nitrogen or the supercritical fluid mixture may be used as a flushing medium. Thus, the supercritical fluid spray 208 may be used to both flush or remove oxygen from the package 204 as well as to impart flavor or fragrance to the packaged product 206. After flushing, the package 204 may be sealed at a sealing station 210 by heat sealing or other conventional methods to obtain shelf stable, coated snack chips 215. As shown in FIG. 2, the snack chips 206 may be produced using a mixing device 90 and dough piece forming device 95 followed by baking in an oven 97 as in the embodiment of FIG. 1. Upon exiting the oven 97, the baked pieces 206 may be cooled on a cooling conveyor 220 and then placed into packages 204 for subsequent spraying with the supercritical fluid mixture.

In other embodiments of the invention, a supercritical fluid mixture may be sprayed upon the baked product in a hooded, cooling conveyor then packaged and sprayed with a different supercritical fluid mixture in a flush packaging system. This arrangement may, for example, be used to apply a colorant to the surface of the baked pieces followed by the incorporation of a fragrance which provides an initial impact of freshness upon opening the package.

The following examples further illustrate the present invention wherein all parts and percentages are by weight and all temperatures are in ° F., unless otherwise indicated:

EXAMPLE 1.

The ingredients and their relative amounts which may be used to prepare a cohesive, machineable dough for producing a low-fat content potato-based snack having a potato-chip like appearance and chip-like texture are:

| INGREDIENTS | WEIGHT % BASED ON TOTAL DOUGH |
|---|---|
| Stage 1 | |
| Soybean Oil | 1.41 |
| Fluid lecithin, unbleached | 0.15 |
| Sugar (sucrose) | 3.29 |
| Calcium acid pyrophosphate | 0.53 |
| Pregelatinized Waxy maize starch | 8.82 |
| Potato flakes | 3.88 |
| Stage 2 | |
| Water | 19.40 |
| Stage 3 | |
| Potato flakes | 19.40 |
| Water | 19.40 |
| Stage 4 | |
| Potato flakes | 23.28 |
| Sodium bicarbonate | 0.42 |
| Total | 100.0 |

In Stage 1, the soybean oil and the fluid lecithin may be premixed and then poured into an upright dough mixer. A preblend of the sucrose and calcium acid pyrophosphate may then be added to the mixer. The pregelatinized starch followed by the Stage 1 portion of the potato flakes may then be added to the mixer. These ingredients may be mixed about one minute to form a substantially homogeneous blend.

In the second mixing stage, water at a temperature of about 95° F. to 105° F. may be added to the dough mixer and admixed with the substantially homogeneous blend for about 3 minutes to uniformly hydrate the pregelatinized starch and to obtain a substantially homogeneous blend.

In the third mixing step, an additional portion of the potato flakes may be added to the dough mixer followed by the addition of the remaining water. The temperature of the added water may be about 95° F. to about 105° F. The ingredients may be mixed for about three minutes to obtain a substantially homogeneous mixture.

In the fourth mixing stage, the remaining portion of the potato flakes may be added to the dough mixer followed by addition of the sodium bicarbonate. Mixing may be continued for about an additional four to eight minutes to uniformly hydrate the potato flakes and to form a cohesive, homogeneous machineable dough. On a calculated basis, the moisture content of the dough (which includes the moisture present in the ingredients as well as the added water of Stages 2 and 3) is about 41% to about 43% by weight, based upon the total weight of the dough.

The dough may be formed into pieces and the pieces may be baked to an end point moisture content of less than about 2% by weight. The baked product may then be transferred to a hooded, cooled tumbler for spraying with a supercritical fluid mixture comprising an oil-soluble fried flavoring composition.

A supercritical fluid flavor formulation may be prepared by supplying liquid carbon dioxide at a pressure of about 830 psia and 20° C. to an American Leewa metering pump to increase its pressure to about 6,000 psi. The pressurized carbon dioxide may be metered at a constant rate to the heating block of a heating and mixing chamber. In the heating block, the carbon dioxide may be heated to raise its temperature above its critical temperature to obtain supercritical carbon dioxide having a temperature of about 37° to about 40° C. The supercritical carbon dioxide may then be metered to a mixing tee within the heating and mixing chamber.

Separately, liquid, TASTEMAKER fried oil flavor number 243736 at atmospheric pressure and about 20° C. may be supplied to another American Leewa metering pump and pressurized to about 6,000 psi. The pressurized flavoring composition may then be metered at a constant rate to the mixing tee within the heating and mixing chamber for admixture with the supercritical carbon dioxide. The carbon dioxide and the flavorant composition may be metered to the mixing tee at rates which provide a carbon dioxide:flavoring weight ratio of about 1:3 in the supercritical carbon dioxide flavoring mixture leaving the heating and mixing chamber.

The admixture of supercritical carbon dioxide and flavoring may be sprayed through a spraying device having an inner diameter of about 0.01 inch. The spray orifices may be externally heated to maintain a temperature of about 20° C. at the orifice to prevent the formation of solid carbon dioxide as the admixture expands to atmospheric pressure within the tumbler.

In the tumbler, the baked pieces may be air cooled to about 75° F. to about 95° F. and the baked pieces may then be sprayed with the mixture of supercritical carbon dioxide and flavorant. The baked chips may be sprayed while being tumbled in the tumbler for a sufficient amount of time for the deposition of a flavoring amount of the flavor on the two major surfaces of the snack chips. The flavored product may then be transferred to a packaging operation for packaging in moisture proof bags. The final flavor-sprayed product may have a fat content of less than about 2 grams of fat per 30 grams of the final product.

EXAMPLE 2

A low fat corn tortilla chip may be produced by forming a corn chip dough into pieces, baking the pieces, and then cooling and spraying the pieces in a tumbler with a mixture of supercritical carbon dioxide and TASTEMAKER TASTEMASTER natural fried corn flavor WONF 224796. The spraying composition may be obtained as in Example 1 except the corn flavor is substituted for the TASTEMAKER fried oil flavor no. 243736.

What is claimed is:

1. A method for reducing the fat content of a food product which is prepared by applying an oil or fat onto the surface of pieces of the food product as a flavorant or as a carrier for a food additive comprising replacing at least a substantial portion of the oil or fat applied onto the surface of the food pieces with an admixture comprising a supercritical fluid and a food additive, the weight ratio of food additive to supercritical fluid admixed with the food additive being at least about 1:5, the admixture being sprayed to atomize the admixture, and then contacting the surfaces of the food pieces with the food additive to deposit an effective amount of the additive on the surface of the food pieces.

2. A method as claimed in claim 1 wherein said food pieces are sprayed with said admixture while being tumbled.

3. A method as claimed in claim 1 wherein said food additive comprises at least one member selected from the group consisting of flavorants, colorants, odorants, vitamins, minerals, and moisture barriers.

4. A method as claimed in claim 2 wherein said supercritical fluid is supercritical carbon dioxide.

5. A method as claimed in claim 1 wherein said food pieces are cooled to a temperature of about 70° F. to about 95° F. and then sprayed with said admixture.

6. A method as claimed in claim 1 wherein said food pieces are crackers, snack chips, or nuts.

7. A method as claimed in claim 1 wherein said fat or oil is replaced in an amount sufficient to reduce the fat content of the food pieces by at least 25% by weight.

8. A method as claimed in claim 6 wherein said food additive comprises an oil soluble flavorant.

9. A method as claimed in claim 4 wherein the admixture of supercritical carbon dioxide and food additive is sprayed at a pressure of at least about 3000 psig.

10. A method as claimed in claim 1 wherein the admixture of supercritical fluid and food additive are sprayed at a pressure greater than 5000 psig.

11. A method as claimed in claim 4 wherein the ratio of the weight of the food additive to the weight of supercritical fluid carrying the food additive is at least about 1:1.

12. A method as claimed in claim 1 wherein said admixture is sprayed onto the food pieces after the pieces are placed in a package.

13. A method for producing reduced-, no-, or low fat content farinaceous based food products comprising:

a) mixing ingredients to obtain a farinaceous based dough, b) baking the dough, c) forming a supercritical fluid admixture comprising a supercritical fluid and a food additive, the weight ratio of food additive to supercritical fluid admixed with the food additive being at least about 1.5, and d) spraying said supercritical fluid admixture to atomize the admixture, and then contacting the baked dough with the additive to deposit the additive onto the baked dough.

14. A method as claimed in claim 13 wherein said food additive comprises an oleaginous based flavorant.

15. A method as claimed in claim 13 wherein said dough is formed into pieces prior to being baked, and the baked pieces are sprayed with said admixture while being tumbled.

16. A method as claimed in claim 13 wherein said supercritical fluid comprises supercritical carbon dioxide and said food additive comprises at least one member selected from the group consisting of flavorants, colorants, odorants, vitamins, minerals, and moisture barriers.

17. A method as claimed in claim 13 wherein said dough is formed into pieces prior to being baked, and the baked pieces are cooled for spraying with said admixture.

18. A method as claimed in claim 13 wherein the admixture of supercritical carbon dioxide and food additive is sprayed at a pressure of at least about 3000 psig.

19. A method as claimed in claim 15 wherein the admixture of supercritical fluid and food additive are sprayed at a pressure greater than 5000 psig.

20. A method as claimed in claim 13 wherein the ratio of the weight of the food additive to the weight of supercritical fluid carrying the food additive is at least about 1:1.

21. A method as claimed in claim 17 wherein said admixture is sprayed onto the food pieces after the pieces are placed in a package.

22. A method for producing reduced-, no-, or low fat content chips or chip-like snacks comprising:

a) forming a starch based composition into pieces, b) heating the pieces, c) cooling the pieces, d) forming a supercritical fluid mixture comprising a supercritical fluid and a food additive, the weight ratio of food additive to supercritical fluid being at least about 1:5, e) spraying the supercritical fluid mixture to atomize the mixture, and then contacting the pieces with the additive to deposit an effective amount of the additive onto the pieces.

23. A method as claimed in claim 22 wherein said pieces are formed from a dough sheet, said heating of the pieces comprises baking, and the baked pieces are sprayed with said mixture while being tumbled.

24. A method as claimed in claim 23 wherein said food additive comprises an oil soluble flavorant.

25. A method for producing a reduced fat, low fat, or no fat baked product comprising providing baked pieces, admixing a flavorant or seasoning with a high pressure gas carrier to obtain an admixture wherein the weight ratio of the flavorant or seasoning to the gas carrier is at least about 1:5, subjecting the admixture to a pressure drop of at least about 450 psi by spraying it through an orifice to separate the carrier from the flavorant or seasoning, then contacting the baked pieces with the flavorant or seasoning to deposit it upon the baked pieces in an effective flavoring amount.

26. A method as claimed in claim 1 wherein the environment in which the food pieces are sprayed is about atmospheric pressure.

27. A method as claimed in claim 1 wherein said weight ratio of food additive to supercritical fluid is in the range of about 1:1 to 3:1.

28. A method as claimed in claim 25 wherein the flavorant or seasoning is deposited as an essentially uniform film covering substantially the entire food surface.

29. A method as claimed in claim 1 wherein the additive is deposited on said surfaces in an amount of from about 0.01% by weight to about 3% by weight, based upon the total weight of the food product.

30. A method as claimed in claim 26 wherein the admixture of supercritical fluid and food additive is sprayed at a pressure of at least about 3000 psig.

31. A method as claimed in claim 1 wherein the supercritical fluid is dissolved in said food additive and the flow of said admixture is single phase.

* * * * *